United States Patent [19]

Desmarais et al.

[11] 4,381,441

[45] Apr. 26, 1983

[54] METHODS OF AND APPARATUS FOR TRIMMING FILM RESISTORS

[75] Inventors: Patrizia R. Desmarais; Anthony J. DiTroia, both of Andover, Mass.

[73] Assignee: Western Electric Company, Inc., New York, N.Y.

[21] Appl. No.: 202,284

[22] Filed: Oct. 30, 1980

[51] Int. Cl.[3] .............. B23K 26/00

[52] U.S. Cl. .............. 219/121 LJ; 219/121 L; 219/121 LH; 219/121 LM; 338/195

[58] Field of Search .............. 29/593, 610 R, 612, 29/620, 574; 219/121 LM, 121 LW, 69 M, 68; 338/195; 350/96.1, 96.12

[56] References Cited

U.S. PATENT DOCUMENTS

| | | | |
|---|---|---|---|
| 3,585,338 | 6/1971 | Rosenthal | 219/68 |
| 3,699,649 | 10/1972 | McWilliams | 29/610 R |
| 3,916,142 | 10/1975 | Ennis | 219/121 LJ |
| 3,930,304 | 1/1976 | Keller et al. | 29/574 |
| 4,146,867 | 3/1979 | Blangeard et al. | 338/195 |
| 4,150,366 | 4/1979 | Price | 340/347 CC |
| 4,182,024 | 1/1980 | Cometta | 29/574 |
| 4,184,062 | 1/1980 | Schmidt | 29/593 |
| 4,191,938 | 3/1980 | Gow et al. | 338/195 |

OTHER PUBLICATIONS

Bojman and Palfi, "Trimming Resistors in Closed Loops", Apr. 1970, IBM Technical Disclosure Bulletin, p. 1787.

Greenman, Kapushoc, Reichert, "Pulsed High-Voltage Resistor Trimmer", Sep. 1967, IBM Technical Disclosure Bulletin, p. 371.

*Primary Examiner*—B. A. Reynolds
*Assistant Examiner*—C. M. Sigda
*Attorney, Agent, or Firm*—J. B. Hoofnagle

[57] ABSTRACT

A hybrid integrated circuit (121) is coupled to an adapter circuit (151) to facilitate trimming of film resistors (126, 127, 128 and 129) formed on the hybrid circuit. The adapter circuit (151) includes a plurality of safety resistors (156, 157 and 158) which are to be selectively added in series with the film resistor (126) to be trimmed. A computer (145) facilitates the measurement of (1) the resistance of the untrimmed film resistor (126) and (2) the gain of the hybrid circuit (121). Depending upon the measured gain, the safety resistors (156, 157 and 158) are selectively added in series with the film resistor (126) to establish a basic resistance value. Thereafter, the film resistor (126) is trimmed by a laser (144) until the resistance value of the film resistor (126) is equal to the basic resistance value. Other safety resistors are used during the trimming of the remaining resistors (127, 128 and 129).

13 Claims, 12 Drawing Figures

METHODS OF AND APPARATUS FOR TRIMMING FILM RESISTORS

FIELD OF THE INVENTION

This invention relates to methods of and apparatus for trimming film resistors and, particularly, to methods of and apparatus for preventing the overtrimming of film resistors by utilizing safety resistances in series with the film resistors during a trimming operation.

BACKGROUND OF THE INVENTION

In hybrid integrated circuits used in communications and other types of systems, resistors formed in a thin film structure are frequently used. It is often necessary to adjust the resistance of the film resistors in the hybrid circuit after the circuit has been physically assembled. To increase the resistance of a film resistor, resistive film of the resistor is trimmed by forming a cut across an electrical current path in the resistor. Such cuts could be made in sections of the film to make the width of the path smaller and thereby increase the resistance. Also, the cuts could be made completely through a selected number of film "rungs" of a ladder structure. In either case, the cut may be formed by mechanical abrasion, chemical etching or laser vaporization of the resistive film material. In the mass production of hybrid circuits, the speed and accuracy of the trimming technique and the attendant control of such trimming becomes economically important. Since the advantages of laser trimming include (1) very high production rates, (2) greater flexibility in functional trimming and (3) tighter tolerances, laser trimming is the preferable technique.

Although the use of a laser in trimming film resistors improves the rate of production, the process still remains one of trimming small amounts and measuring a signal which is affected by the resistor being trimmed to determine and monitor the trimmed resistance value. Moreover, in cases where a plurality of resistors are formed on a single substrate, if one of the resistors is overtrimmed, the entire substrate has to be discarded, even though the other resistors may be within desired values or capable of adjustment thereto.

U.S. Pat. No. 3,699,649, which issued to D. A. McWilliams, discloses a method and apparatus for automatically trimming resistors in production quantities. A resistor substrate, which is to be trimmed, is positioned on a mechanical table. A set of probes which is coupled to a monitor sensing network, engages the substrate to monitor the resistance value during adjustment. A mask of a grid pattern based on the geometric requirements of the desired circuit of the film is positioned above the substrate. The mask has openings at required precision adjustment points. Fiber optic light pipes with appropriate focusing characteristics are joined to the points and focus light conducted by the fiber optics. The receiving ends of the fiber optic light pipes are then aligned at a support in a single line to receive a laser beam. The support at the receiving end of the light pipes is movable relative to the beam such that the receiving ends are rapidly placed in sequence within the path of the laser beam. The moving sequence may be coordinated with a programmed network which predetermines the final desired resistance value. The laser may be arranged to be responsive to the monitor circuit such that each resistor is individually and automatically trimmed to its final desired value.

The apparatus above monitors the resistance of the film resistor while it is being trimmed. It does not adjust the resistor as a functional part of a circuit in which it is used. Thus, other circuit characteristics which affect the operation of the circuit must be adjusted separately.

Consequently, there is a need for an apparatus which quickly trims a resistor as a functional part of a circuit in which it is used.

SUMMARY OF THE INVENTION

This invention contemplates a method of and apparatus for trimming a film resistor wherein the resistance value of the resistor is determined. The resistor is connected to a gain-producing circuit. A gain level, which is related to a basic resistance value, is established for the gain-producing circuit. Resistance is selectively added to the resistor to increase the gain to a level not to exceed the established gain level. The determined value of resistance is added to the value of resistance which was selectively added to obtain the basic resistance value. The resistor is trimmed to increase the value thereof. The trimming of the resistor is stopped when the trimmed value thereof is equal to the basic resistance value.

BRIEF DESCRIPTION OF THE DRAWINGS

FIG. 2 is a schematic of a simulator/safety-resistor adapter circuit which forms a portion of the system of FIG. 3 in accordance with certain principles of the invention;

DETAILED DESCRIPTION

Figure 1:
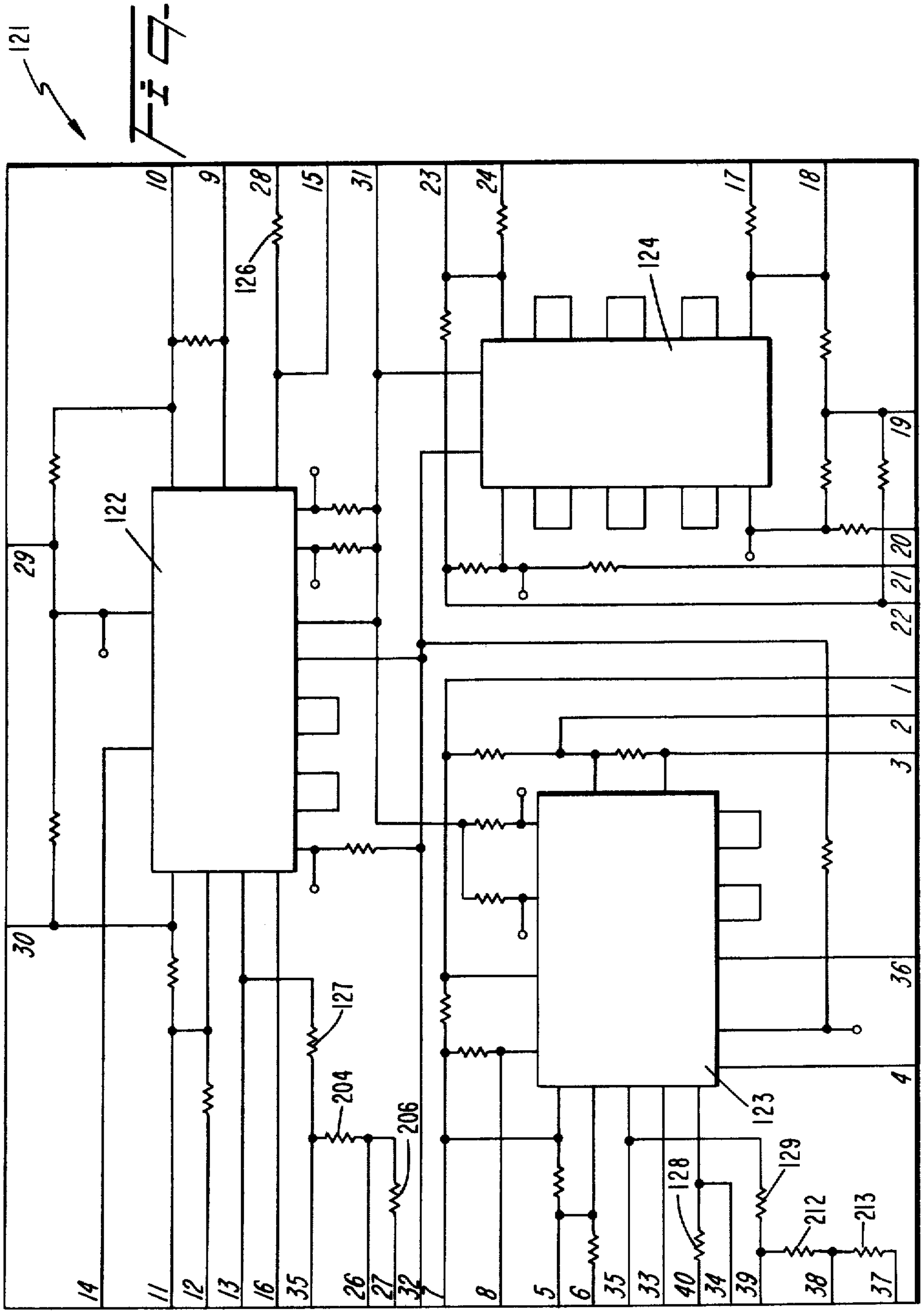
FIG. 1 is a schematic representation of a circuit used in a communications system.
Figure 12:
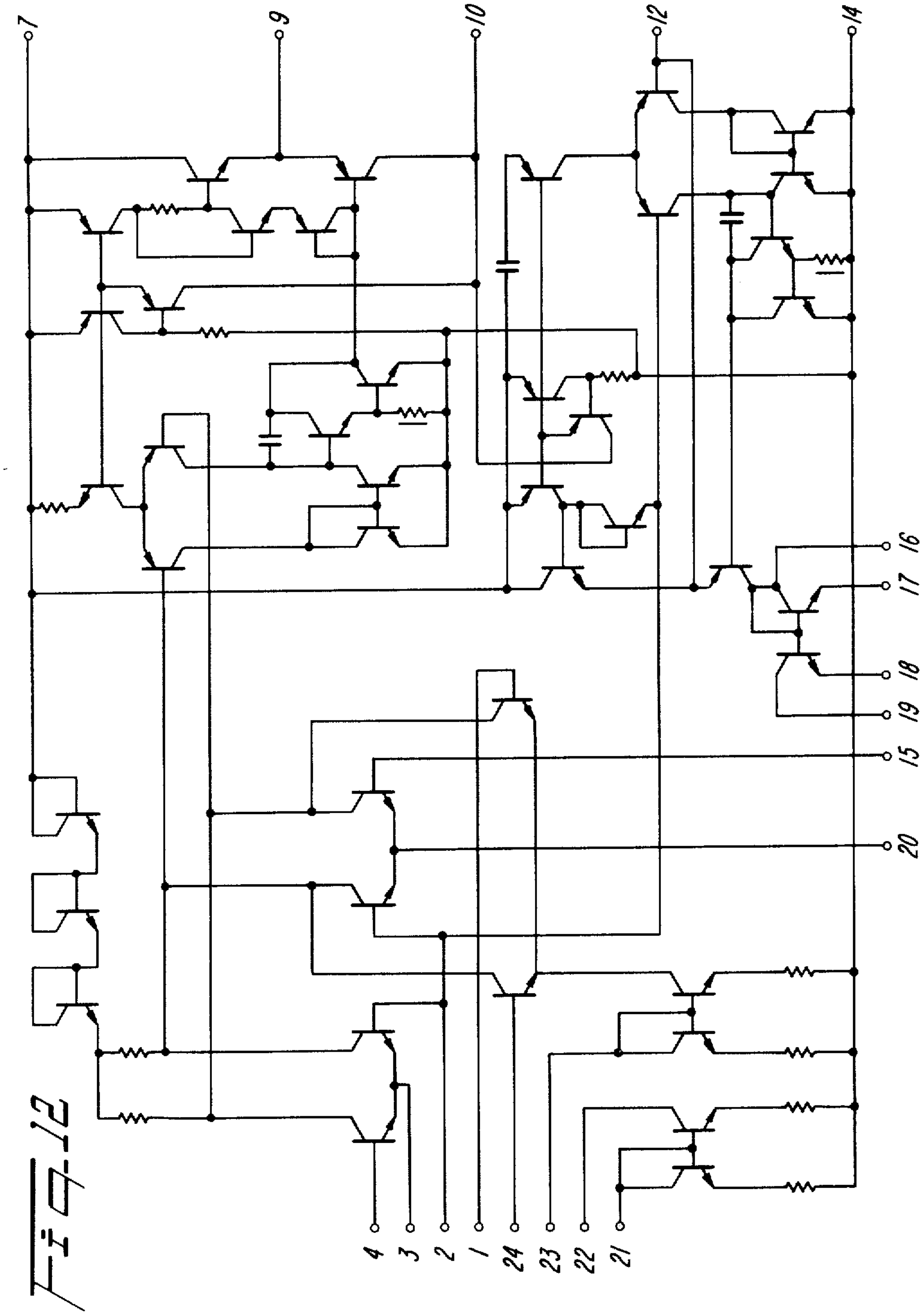
FIG. 12 is a schematic of an integrated circuit used in the circuit of FIG. 1.

Referring to FIG. 1, a hybrid integrated circuit, designated generally by the numeral 121, is designed as a gain-producing circuit for use in a communications system (not shown). The circuit 121 includes two integrated circuits 122 and 123 of identical circuit design. The schematic of each of the circuits 122 and 123 is illustrated in FIG. 12. Another integrated circuit 124 is included in the hybrid circuit 121 and is disclosed in the Digest of Technical Papers of the IEEE International Solid-State Circuits Conference, first edition, February, 1972, as pages 174 and 175.

Figure 2:
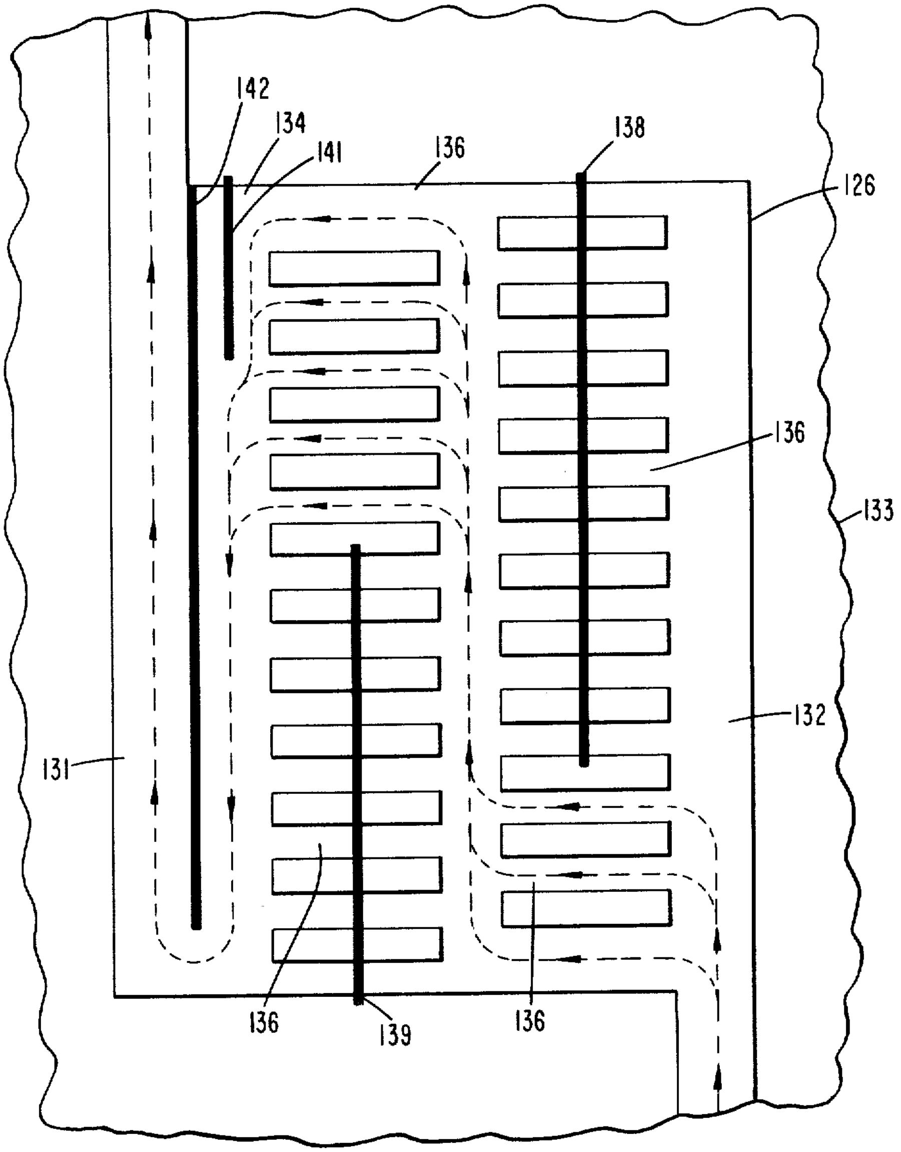
FIG. 2 is a diagram of a film resistor used in the circuit of FIG. 1.

The hybrid integrated circuit 121 also includes four film resistors 126, 127, 128 and 129, each of which are structurally arranged as illustrated in FIG. 2 with respect to resistor 126. Referring to FIG. 2, resistor 126 includes two spaced rectangular film pads 131 and 132 formed on an insulative substrate 133 and which function as the termination points for the resistor. A film resistance element 134 is joined with and extends along the length of pad 131. A plurality of film "rungs" 136 are joined with element 134 and pad 132 and extend to and are joined with an intermediate film strip 137.

Coarse adjusting of the value of resistor 126 is accomplished by trimming the "rungs" 136 along trim lines 138 and 139. Fine adjusting of the value of resistor 126 is accomplished by trimming the film resistance element 134 along trim lines 141 and 142. Current flow paths for the trimmed resistor 126 are illustrated in dotted lines.

Referring again to FIG. 1, hybrid integrated circuit 121 is destined for assembly in the communications system which has precise operational requirements. Due to permissible tolerance values of the variety of components assembled within the hybrid circuits 121, each circuit could operate at a different gain level than other seemingly identical hybrid circuits. However, operational parameters of the communications system require that each circuit 121 provide substantially the same gain level within the communications system. Therefore, adjustment of resistors 126, 127, 128 and 129 of all circuits 121 to the same respective resistance values will not necessarily provide for uniform gain during operation of the circuits. To avoid this possibility, each hybrid circuit 121 is powered and operated within a test environment in a manner which simulates ultimate operation in the communications system. During such operation, resistors 126, 127, 128 and 129 are adjusted in value and the gain level of the operational hybrid circuit 121 is monitored rather than monitoring the resistance of the resistors being adjusted. Thus, resistors 126, 127, 128 and 129 are functionally trimmed to provide uniform gain level for all hybrid circuits 121 rather than uniform respective resistance values of the resistors.

Figure 3:
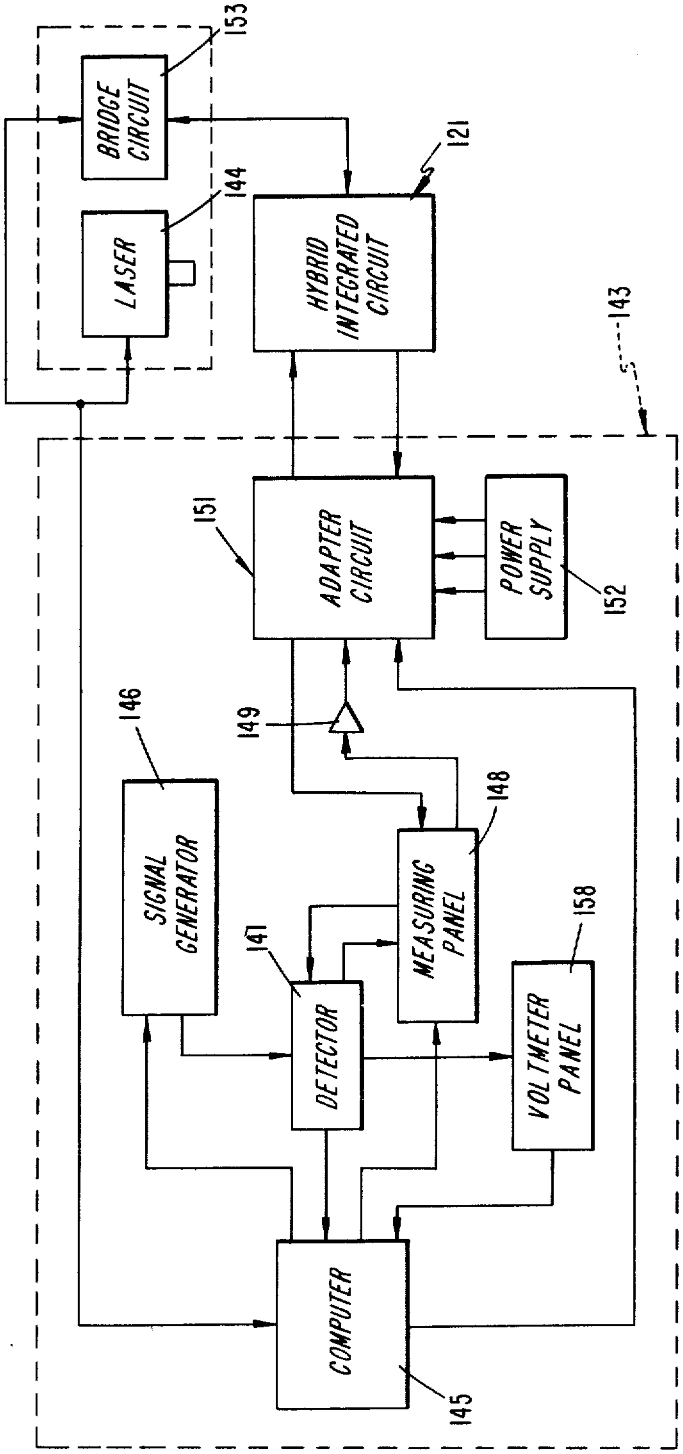
FIG. 3 is a block diagram of a system for controlling the adjusting of film resistors and gain level of the circuit of FIG. 1 in accordance with certain principles of the invention.

Referring to FIG. 3, there is illustrated a block diagram of a system 143 which provides for (1) the simulated operation of the hybrid integrated circuit 121, (2) the control of a laser 144 during a resistor trimming operation and (3) the monitoring of change in the gain level of the hybrid circuit during the trimming operation. Laser 144 is a Model 44 commercially available from Electro Scientific Industries of Portland, Oregon. The system 143 includes a computer 145 such as a Model PDP 11/04 available from Digital Equipment Corporation of Maynard, Massachusetts. The computer 145 provides control for the application of a hybrid-circuit operational signal to be supplied by a signal generator 146 and fed to a detector 147. The signal generator 146 is a Model 3330B and the detector 147 is a Model 3570A, both available from Hewlett-Packard Corporation of Palo Alto, California. The signal is then coupled through a gain/loss measuring panel 148, a buffer 149, to establish a zero impedance level at the output thereof, and ultimately to a simulator/safety-resistor adapter circuit, designated generally by the numeral 151. The adapter circuit 151 is powered by power source 152 which provides potential at levels of negative seven volts, negative twelve volts and positive eighteen volts. The adapter circuit 151 is connected to the hybrid circuit 121 and provides simulated operation for the hybrid circuit during periods when the resistors 126, 127, 128 and 129 are being trimmed.

In a typical resistor trimming operation, the value of the film resistance is initially low. As resistive film is trimmed away, the resistance value increases. For example, as "rungs" 136 of resistor 126 (FIG. 2) are trimmed along lines 138 and 139, the available conductive resistance film paths within the resistor are reduced thereby increasing the resistance value. This provides for a coarse trim which can be accomplished relatively rapidly. Then, for fine trimming to the final desired resistance value, element 134 is trimmed along lines 141 and 142.

Typically, the fine trimming must be conducted comparatively slowly to insure that the resistor 126 is not overtrimmed. If resistor 126 is overtrimmed, the resistance value exceeds the desired value and the process can not be reversed. Therefore, the entire hybrid circuit 121 would have to be discarded.

In one technique for the fine trimming operation, element 134 is trimmed along line 141 for a short distance and the trimming is stopped. The gain is measured and, if needed, another short trimming step is taken along line 141. This trim-stop-and-measure routine is followed along lines 141 and 142 until the desired resistance value, or gain level, is attained. However, this routine is tedious, slow and comparatively inefficient. The reason that such a slow process is followed is to insure that the resistor 126 is not overtrimmed.

To preclude the overtrim possibility while accelerating the trimming operation, the adapter circuit 151 selectively adds, under control of computer 145, the value of a small amount of safety resistance to the value of the resistor 126 to be fine trimmed to obtain a basic resistance value. A resistance value slightly less than the basic value is selected as a trim target value. This permits system 143 to trim quickly the resistor 126 to the trim target value without concern for overtrimming the resistor. Thereafter, the safety resistance value may be lowered to facilitate selection of a second target value and additional rapid trimming is effected. This process is continued until safety resistance is no longer required and the desired gain level has been attained.

A bridge circuit 153, which is contained within the commercially-available laser 144, is connectable selectively to any one of the resistors 126, 127, 128 or 129 under control of the computer 145 to obtain an initial reading of the resistance value of the resistors before trimming the selected resistor. This value may be later combined with the selected safety resistance value, if the safety resistance is needed, to obtain the basic value. The later-determined basic value provides a basis for determining the trim target value. The resistance value of the resistor 126, 127, 128 or 129 is being monitored during the fine trimming operation to determine when the trimmed resistance reaches the trim target value. Additional fine trimming is accomplished by forming cuts of predetermined distances in the resistor film while monitoring the gain level.

When the signal is being processed through the adapter circuit 151 and the hybrid circuit 121, signal transmission loss occurs and must be compensated to obtain an accurate reading of the gain level attained by the hybrid circuit. When the gain level is being monitored during a trimming operation, the output of the hybrid circuit 121 is fed through the adapter circuit 151 to the panel 148. The signal transmission loss is measured within the panel 148 by comparing the original signal fed from detector 147 with the output signal from adapter circuit 151. Under computer control, "dB" pads (not shown) are added within the panel 148 as a measure of signal loss to a level within 0.1 dB during transmission of the signal through the adapter circuit 151. The measured loss is observed by computer 145. The output signal is fed from panel 148 through detector 147 to a voltmeter panel 154 where signal transmission loss is further measured to a level within 0.01 dB which loss is observed by computer 145. The computer 145 compensates for the losses measured by panels 148 and 154.

Computer 145 then evaluates the loss-compensated gain reading with a standard established within the computer. Based upon this evaluation, computer 145 will determine whether the gain level has been reached or whether safety resistance can be reduced or removed before proceeding with additional fine trim.

Figure 4:
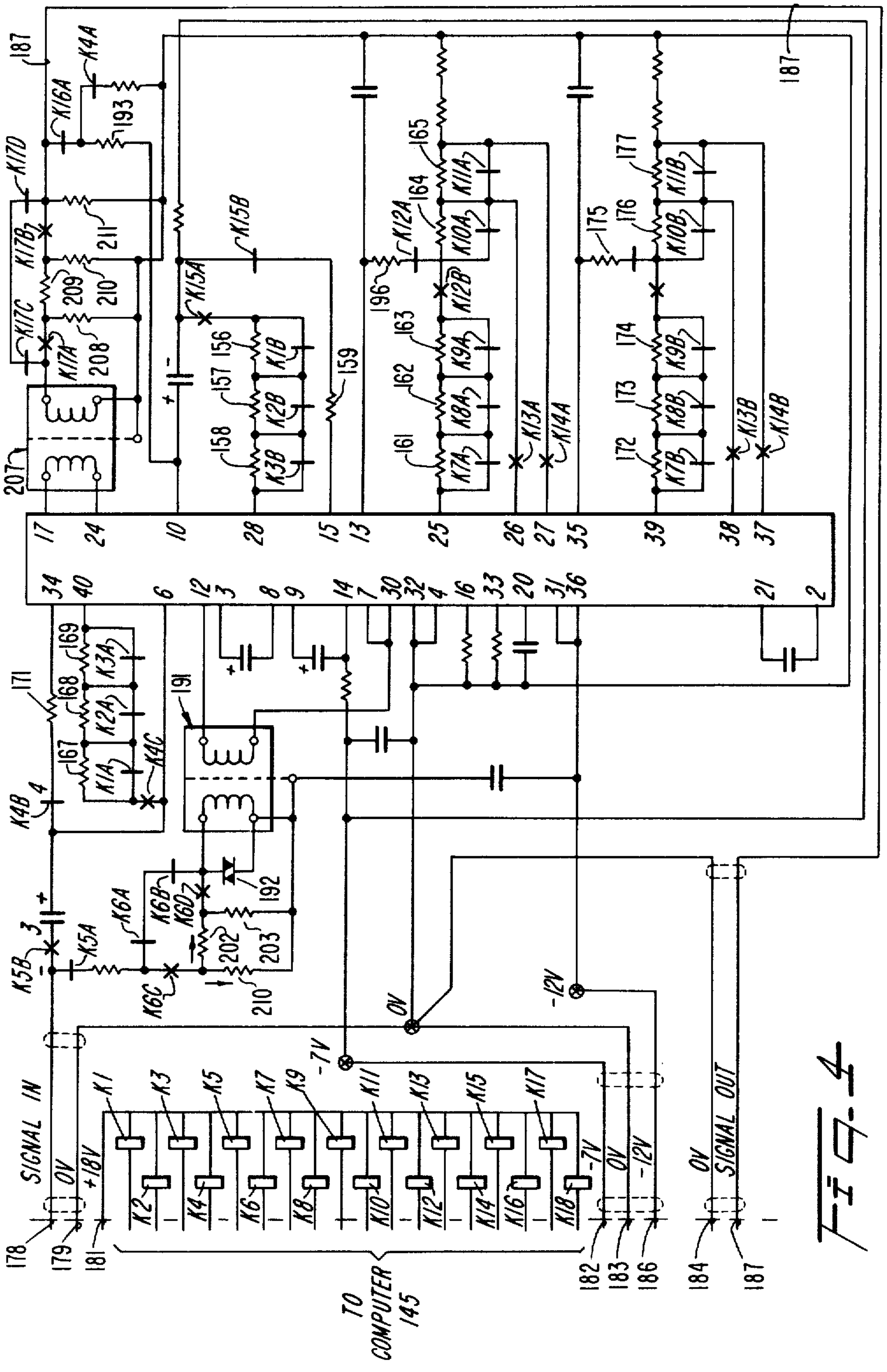
Figure 5:
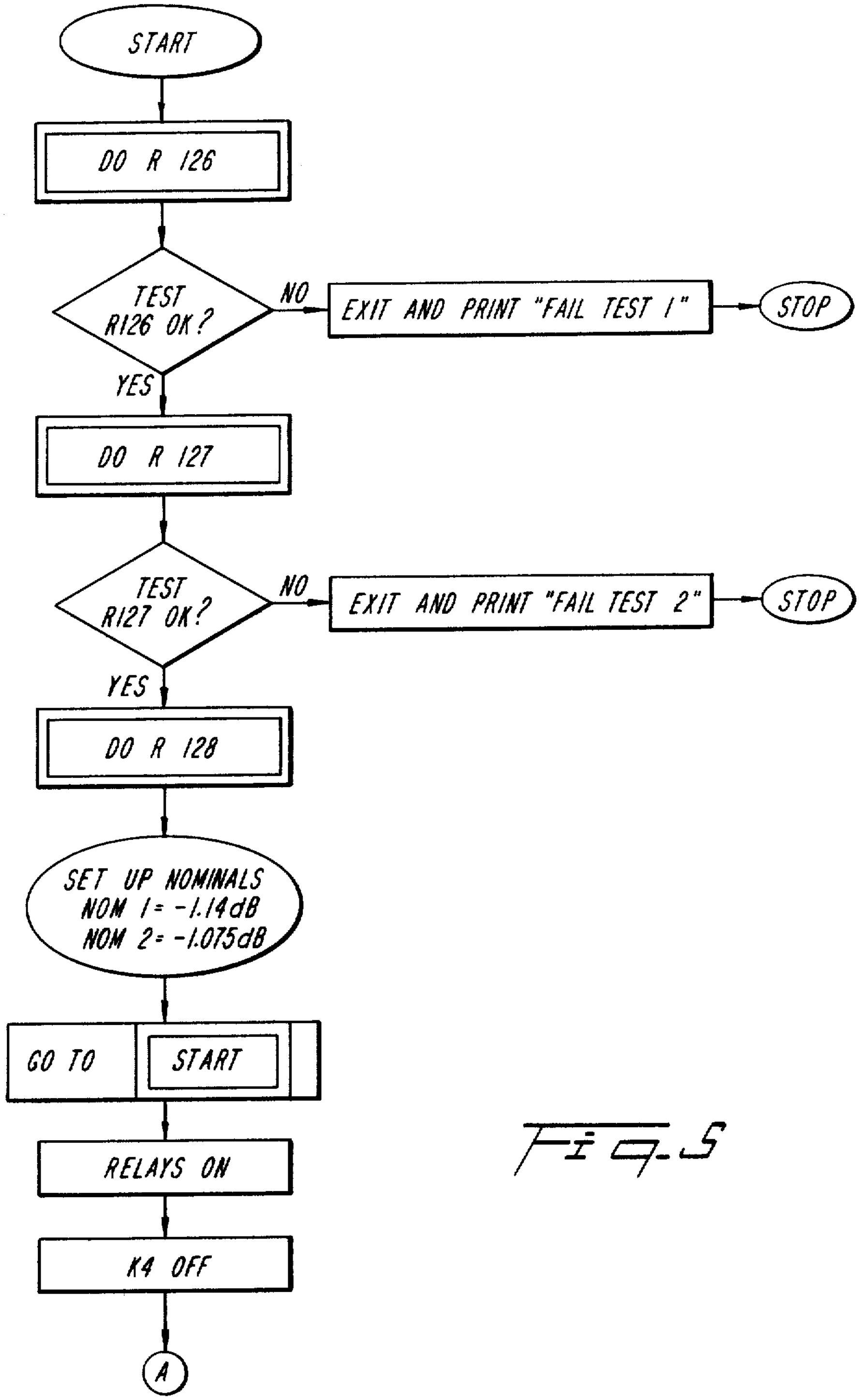
FIGS. 5 through 11 represent a flow diagram illustrating the programmed procedure of control and operation of the adapter circuit of FIG. 4 in accordance with certain principles of the invention.

Referring to FIG. 4, the adapter circuit 151 includes eighteen relays represented by coils K1 through K18 and corresponding contacts, for example, K1A, K1B; K2A, K2B; etc. Unnumbered capacitors and resistors within the adapter circuit 151 are connected to hybrid circuit 121 and simulate the circuit (not shown) within the communications system with which the hybrid circuit will ultimately be connected. The hybrid circuit 121 is represented as a rectangular box in the middle of FIG. 4 with termination numbers inside the box corresponding to termination numbers illustrated at the perimeter of the hybrid circuit in FIG. 1.

A first series of three resistors 156, 157 and 158 are connected in parallel with contacts K1B, K2B and K3B, respectively. The three resistors 156, 157 and 158 are safety resistors which can be selectively added in series with film resistor 126, under computer control, during the fine trimming of resistor 126. Resistor 159, which has a value representing a normal value for resistor 126, can be added selectively to the adapter circuit 151 to replace resistor 126 during an initialization procedure, if conducted, to determine whether other components and parameters of hybrid circuit 121 will ultimately satisfy operational requirements. This portion of the initialization procedure will include resistors 166 and 196 to replace resistor 127 (FIG. 1) and will eliminate an unnecessary trimming operation if the hybrid circuit 121 is going to fail for reasons other than the overtrim of resistor 126.

Resistors 161, 162 and 163 are connected in parallel with contacts K7A, K8A and K9A, respectively. Resistors 161, 162 and 163 are safety resistors which can be added selectively in series with resistor 127, under computer control, during the fine trimming of resistor 127. Resistors 164 and 166 represent resistance values of resistors (not shown) which are contained in the communications system. Due to variations in gain capabilities of different hybrid circuits 121, a test is made to determine whether the corresponding communications system resistors will be required. Depending on the test result, combinations of resistors 164 and 166 may be selectively added to the adapter circuit 151, under computer control, to provide the simulated effect. To effect the selection of resistors 164 and 166, the resistors are connected in parallel with contacts K10A and K11A, respectively. Contacts K13A and K14A facilitate the connection of the selected combination of resistors 164 and 166 with hybrid circuit 121.

Resistors 167, 168 and 169 are connected in parallel with contacts K1A, K2A and K3A, respectively, and are connectable, under computer control, in series with resistor 128 (FIG. 1) of hybrid circuit 121 as safety resistors during the fine trimming of resistor 128. Resistor 171 can be added selectively to adapter circuit 151 to replace resistor 128 (FIG. 1) of hybrid circuit 121. Resistor 171 would be used in the same manner as resistor 159 during an initialization procedure if such a procedure is conducted. This portion of the initialization procedure will include resistors 175 and 177 to replace resistor 129 (FIG. 1).

Resistors 172, 173 and 174 are connected in parallel with contacts K7B, K8B and K9B, respectively, and are connectable, under computer control, in series with resistor 129 (FIG. 1) of hybrid circuit 121. Resistors 176 and 177 are connected in parallel with contacts K10B and K11B, respectively, and function in the same manner as resistors 164 and 166. Contacts K13B and K14B facilitate the connection of resistors 176 and 177 with hybrid circuit 121.

The signal from signal generator 146 (FIG. 3), and more specifically from buffer 149 (FIG. 3), enters the adapter circuit 151 on input line 178. Input line 179 is connected to ground or zero volts level. Input line 181 is connected to the positive side of the eighteen volts power source. Line 181 is further connected to one side of the relay coils K1 through K18. The other side of each of the coils K1 through K18 is connected to the computer 145 which directly controls the selection and operation of the relays. Line 182 is connected to the negative seven volts supply, lines 183 and 184 are connected to ground or zero volts, line 186 is connected to the negative twelve volts supply and line 187 is the signal output line from the adapter circuit 151.

Initially the hybrid circuit 121 is placed on a table (not shown) beneath the laser 144 and through computer-controlled relative movement between the table and the laser, the hybrid circuit is placed in a start position relative to the laser.

Thereafter, the initialization procedure is initiated. Under normal conditions, contact K15A is open and K15B is closed. Therefore, the line connected to termination 28 of the hybrid circuit 121 (FIG. 1) is open and film resistor 126 is removed from connection with the adapter circuit 151. The normal closure of contact K15B connects adapter circuit resistor 159 to termination 15 of the hybrid circuit 121 so that resistor 159 effectively replaces resistor 126. The resistance value of resistor 159 represents a normal value for ultimately trimmed resistor 126.

Thereafter, the incoming signal from the signal generator 146, and more specifically the buffer 149, is coupled through normally closed contact K5A, impedance matching resistor 189, normally closed contacts K6A and K6B and is applied to the primary of impedance matching transformer 191. A varistor 192 is connected across the primary of transformer 191 to keep the primary voltage relatively low, for example 0.6 to 0.7 volt. The signal is coupled through the transformer 191 and is applied to termination 12 of the hybrid circuit 121 (FIG. 1). The signal is processed through the hybrid circuit 121 and appears at output termination 10. The signal is then fed through divider resistor 193 and normally closed contact K16A to adapter circuit output line 187. One side of a dropping resistor 194 is connected to ground and the other side is connected through normally closed contact K4A to a juncture between resistor 193 and contact K16A and drops the output signal to a level within the working range of detector 147. Also, contacts K12A and K10A are normally closed and coil K11 is controlled to open contact K11A to facilitate the series addition of resistor 166 with a resistor 196 within the adapter circuit 15. The combined value of resistors 166 and 196 represent a normal value of resistance to replace resistor 127.

During this period, resistor 159 represents a normal value within the hybrid circuit 121 and, therefore, the hybrid circuit should provide an output signal indicating the desired gain level for the signal being processed through the hybrid circuit. The output signal is then coupled to the computer 145 as previously described and compared with a predetermined desired gain range previously established within the computer. If the gain of the output signal falls within the range, the hybrid circuit 121 passes the first test and can now procede to the trimming operation for resistors 126 and 127. If the gain level falls outside of the gain range, the hybrid circuit 121 has failed the test and is discarded.

Assuming that the hybrid circuit 121 has passed the initialization test, computer 145 controls coil K15 to disconnect resistor 159 from the adapter circuit 151 and further instructs the laser 144 to procede with the coarse trimming operation of resistor 126. The coarse trimming is a functional operation where, as each rung 136 (FIG. 2) of resistor 126 is cut through, the gain of hybrid circuit 121 is measured. This procedure is continued until nine rungs 136 are cut through along line 138 or until the gain is greater than minus 3.0 dB. If the gain is less than minus 3.0 dB and nine rungs 136 have been cut, the laser 144 is then moved to line 139 and a similar procedure is conducted until eleven rungs have been cut or the minus 3.0 dB level has been reached. If the minus 3.0 dB level has not been reached, the laser 144 returns to line 138 and cuts through the tenth rung 136, and the eleventh rung if needed, in an attempt to obtain a gain level which exceeds the minus 3.0 dB level. If the gain level still does not exceed the minus 3.0 dB level, the hybrid circuit 121 has failed and will be discarded. In any event, this completes the coarse trimming operation.

Upon completion of the coarse trimming operation, the gain level of hybrid circuit 121 is measured. If the measured gain level has exceeded the maximum level of the predetermined range, the hybrid circuit 121 must be discarded. If the measured gain level has not exceeded the maximum level of the predetermined range, the computer 145 instructs the laser 144 to procede to a position in preparation for the fine trimming operation. Coil K18 is then operated to open normally-closed contacts K18A and K18B whereby operating power is removed from hybrid circuit 121. Bridge circuit 153 is then instructed to measure the coarse-trimmed value of resistor 126 which value is stored in computer 145. Coil K18 is controlled to return operating power to hybrid circuit 121.

When computer 145 controlled coil K15 to disconnect resistor 159, resistors 156, 157 and 158 were placed in position to be connected in the adapter circuit 151 by control of contacts K1B, K2B and K3B, respectively. The computer 145 then initiates a process where coil K1 is operated to add resistor 156 in series with resistor 126 (FIG. 1). The gain of hybrid circuit 121 is then measured and a determination is made as to whether the gain exceeds the minimum level of a predetermined range of minus 1.14 dB to minus 1.075 dB. If the gain does exceed the minimum level of minus 1.14 dB, and having already determined that it has not exceeded the maximum level of minus 1.075 dB at the end of the coarse trimming operation, the resistor 126 has been trimmed to the desired resistance value. The computer 145 then instructs the system 143 to procede to the trimming of resistor 127.

If the gain does not exceed the minimum level, computer 145 facilitates the removal of resistor 156 and the addition of resistor 157 into the adapter circuit 151 in series with resistor 126. The gain is again measured to determine whether the gain exceeds the minimum level of the range. This procedure is continued whereby various combinations of resistors 156, 157 and 158 are tried until the measured gain exceeds the minimum level of the gain range.

Coil K5 is then controlled by computer 145 to open contact K5A whereby the signal is no longer being applied to resistor 126. The value of resistance derived from the selected combination of one or more of the resistors 156, 157 and 158 is added, by computer control, to the value of resistor 126, previously measured by bridge 153, to obtain a basic resistance value. The computer 145 then selects 0.9 of the basic value to serve as a trim target value for a first phase of the fine trimming operation. Thus, the safety resistors 156, 157 and 158 are used to facilitate the establishment of the basic resistance value by functional analyzation of the hybrid circuit 121. The basis resistance value represents a value which falls within the desired gain range of minus 1.14 dB to minus 1.075 dB. However, the basic resistance value includes the value any of the safety resistors 156, 157 and 158 which were added to the adapter circuit 151 during this selection period. This technique provides assurance that, while the basic resistance value is sufficient to provide for a gain level which is close to the minimum range level, the resistance value of resistor 126 is still safely below the minimum level.

To insure that a trim target resistance value is further safely below the minimum level of the range during the first phase of the fine trimming operation, the computer 145 establishes a target value which is 0.9 of the basic resistance value. Thereafter K18 is controlled to remove power from the hybrid circuit 121. The laser 144 is then instructed to begin the first phase of the fine trimming operation along line 144. If lines 141 and 142 each extend beyond predetermined respective distances, resistor 126 can not be trimmed to a value which will provide for the desired gain level. Therefore, data relating to the maximum distance of travel of laser 144 during the fine trimming operation is stored in the computer 145.

During the first phase of the fine trimming operation, the bridge circuit 153 continuously measures the changing value of resistor 126. If the target value is attained during the cutting of line 141, the laser 144 is stopped and the computer 145 instructs the laser to await further instructions for the first phase of the fine trimming operation. If the end of line 141 is reached before the target value is attained, the laser 144 is instructed to proceed to and begin to cut on line 142. Again, the bridge circuit 153 continously measures the changing value of resistor 126. If the laser 144 cuts the finite maximum length allowed for line 142 and the target value has not been attained, indication is provided that resistor 126 can not be trimmed to ultimately provide the desired gain. In that event, the hybrid circuit is discarded. If the target value is attained during the cutting of line 142, the laser 144 stops and awaits further instructions for the first phase of the fine trimming operation.

When the target value is attained during the cutting of either lines 141 or 142, the laser 144 ceases the cutting operation. The fine-trimmed value of resistor 126 is again measured by bridge circuit 153 and the value is stored in computer 145. Power is restored and the signal is fed through the hybrid circuit 121 and adapter circuit 151. The process of determining the combination value of safety resistors 156, 157 and 158 is again conducted in conjunction with the newly fine-trimmed value of resistor 126. If it is determined that no safety resistance need be added, then the laser 144 is instructed to procede to the second phase of the fine trimming operation. If safety resistance is to be added to newly fine-trimmed value of resistor 126, a new basic resistance value is determined by computer 145 in the same manner as described above. The computer 145 then selects 0.9 of the new basic value as a trim target value and the laser 144 is instructed to continue trimming on the same line 141 or 142. Eventually, either the finite length of line 142 is reached before the target value is reached, or the target value is attained.

The process of selecting a base resistance value, and related target value, may be conducted several times before it is finally determined that no additional safety resistance is required. At this point, and assuming that the end of line 142 has not been reached, the laser 144 is instructed to enter the second phase of the fine trimming operation.

The process followed during the first phase of the fine trimming operation could be used as the only process in trimming film resistors wherein the initial measured value of resistance is the value of the untrimmed resistor.

In the second phase, the laser 144 will continue cutting on the same line 141 or 142 which it was cutting at the end of the first phase unless the laser is at the end of line 141. In this event, the laser 144 procedes to line 142. In the second phase of the fine trimming operation, laser 144 is instructed to trim for a finite distance, for example 0.020 inch, previously stored in computer 145. After this cut is made, computer 145 examines the position of the laser 144 relative to lines 141 and 142. If the laser 144 has cut to a point near the end of line 142, resistor 126 has been trimmed as much as possible and the trimming operation is stopped. Assuming the desired gain level has not been attained, the hybrid circuit 121 is discarded. If the laser 144 is near the end of line 141, computer 145 instructs the laser to move to line 142. Thereafter the gain is measured.

If the measured gain is less than minus 1.5 dB, the laser 144 is instructed to process through a cut of the same finite distance, 0.020 inch, as the first cut. If the measured gain is greater than minus 1.5 dB but less than minus 1.2 dB, the finite cut distance is decreased, for example to 0.005 inch. If the measured gain is greater than minus 1.2 dB, the finite cut distance is decreased even further, for example to 0.002 inch. If the measured gain is within the predetermined range of minus 1.14 dB to minus 1.075 dB, the trimming of resistor 126 has been successfully completed. Computer 145 then prepares system 143 to procede with the trimming of resistor 127.

The second phase of the fine trimming operation, therefore, includes one or more short cuts along lines 141 or 142 with gain measurements taken between cuts. Based on the measured gain, additional cuts of the same or shorter distances are made until a gain is attained within the predetermined range.

It is noted that the trimming of resistors 127, 128 and 129 is accomplished in the same manner. However, some differences exist in the operation of peripheral portions of adapter circuit 151 regarding each of the resistors 127, 128 and 129 which are described below.

Referring to FIG. 4, in preparation for the trimming of resistor 127 (FIG. 1), coil K6 is controlled by computer 145 to reverse contacts K6A, K6B, K6C and K6D from the condition illustrated in FIG. 4. This results in the connection of an attenuator network, including resistors 201, 202 and 203, being connected between input line 178 and transformer 191. Further, coil K15 is controlled to reverse contacts K15A and K15B to connect trimmed resistor 126 with the adapter circuit 151. Coil K12A is controlled to reverse contacts K12A and K12B to connect to-be-trimmed resistor 127 with adapter circuit 151 and to disconnect resistor 196. Also, the closing of contact K12B places resistors 161, 162 and 163 in position to be connected in the adapter circuit 151.

A pair of relatively high resistance resistors (not shown) are included in the circuit of the communications system into which the hybrid circuit 121 will ultimately be connected. A first of this pair of resistors will be connected between terminations 25 and 26 of hybrid circuit 121 while a second of the pair will be connected between terminations 26 and 27. The first and second resistors correspond in value to resistors 164 and 166, respectively. Prior to the trimming of resistor 127, combinations of resistors 164 and 166 are connected with the hybrid circuit 121 and the gain is measured to determine whether the corresponding first and second resistors of the circuit in the communications system will be needed. If the resistor corresponding to resistor 164 is needed, shorting resistor 204 (FIG. 1) is trimmed open by laser 144. If the resistor corresponding to resistor 166 is needed, shorting resistor 206 is trimmed open by laser 144. Further, the same combination of resistors 164 and 166 is retained within the adapter circuit 151 during the trimming of resistor 127.

The procedure of trimming resistor 127 then procedes in the same manner as resistor 126. The output signal from hybrid circuit 121 appears at termination 10 and is processed through resistor 193 to output line 187 with dropping resistor 194 being connected across the output. After the trimming of resistor 127 has been completed, the computer directs system 143 to procede with the trimming of resistor 128.

Initially, coils K5, K16 and K17 are controlled to reverse the corresponding contacts thereof to a condition reverse of those illustrated in FIG. 4. Closure of contact K5B and the opening of contact K5A directs the incoming signal through resistor 171 which simulates the ideal value for resistor 128 (FIG. 1). A gain measurement is then taken and compared with the predetermined range in the same manner as described above with respect to resistor 159 and resistor 126 (FIG. 1). This provides indication of the acceptability of the remaining parameters in the hybrid circuit 121 relating to circuits associated with resistors 128 and 129. The output of hybrid circuit 121 appears across terminations 17 and 24 and is fed to the primary of an impedance matching transformer 207. The output appearing across the secondary of the transformer 207 is coupled to an attenuator network including resistors 208, 209 and 210 by virture of closed contacts K17A and K17B and appears across impedance matching resistor 211. By virtue of closed contact K16B, the output signal is then fed to output line 187.

Assuming the test which included resistor 171 is successful, coil K4 is operated to open contact K4B and close contact K4C. Resistors 167, 168 and 169 are thereby placed in position to be connected in the adapter circuit 151. The procedure for trimming resistor 128 is then initiated with the output signal being coupled through transformer 207, the attenuator network of resistors 208, 209 and 210, and resistor 211. The trimming procedure for resistor 128 is accomplished in the same manner as described for resistor 126.

After resistor 128 has been successfully trimmed, computer 145 directs system 143 to initiate the trimming procedure for resistor 129. Coil K17 is controlled to close contacts K17C and K17D and to open contacts K17A and K17B. This results in the output signal being shunted around the attenuator network of resistors 208, 209 and 210. A determination is made as to whether resistors 176 and 177 are needed in the adapter circuit 151 during the trimming of resistor 129 in the same manner that a determination was made with respect to resistors 164 and 166 for resistor 127. Also, shorting resistors 212 and 213 (FIG. 1) may be laser-trimmed open depending on the need for a pair of resistors (not shown) in the communications system which correspond to resistors 176 and 177.

This completes the resistor trimming and gain adjusting of hybrid circuit 121.

Referring to FIGS. 5 through 11, the flow charts illustrated therein reveal the procedures for trimming resistors 126, 127, 128 and 129. The procedures for trimming the resistors 126, 127, 128 and 129 are substantially the same. Thus, for purposes of illustration, the procedure for trimming resistor 128 will be explained in greater detail. The differences between the procedures will be explained below. Initially, an operator starts the procedure by pressing a start button (not shown) which locates the laser 144 over the hybrid circuit 121. Thereafter the computer 145 automatically calls a procedure to test and trim resistor 126 until a desired gain is achieved. If the testing and trimming of resistor 126 was not successful, the computer 145 facilitates the printing of a message indicating test failure and stops the procedure. As noted above, if the resistor 126 is overtrimmed, the resistance value has exceeded the desired value and the process can not be reversed. Therefore, the entire hybrid circuit 121 would have to be discarded. However, if the testing and the trimming of resistor 126 was successful, the computer 145 calls a procedure to test and trim resistor 127. If the testing and trimming of resistor 127 fails, the computer 145 stops the procedure in the same manner as noted above. However, if the resistor 127 is tested and trimmed to a desired value, the computer 145 calls a procedure to test and trim resistor 128.

The trimming of resistor 128 affects the gain of the circuit 121 as detected by the detector 147 (FIG. 3). Thus, the computer 145 facilitates the establishment of a maximum nominal value (NOM2) and a minimal nominal value (NOM1) of gain between which the circuit 121 must be functionally trimmed. The computer 145 initiates the application of the proper signal which is fed to the adapter circuit 151. Relay coils K5, K11, K16 and K17 are energized to operate relay contacts K5B, K11B, K16B, K17A and K17B. This facilitates the application of the signal to the circuit 121 through resistor 171 (FIG. 4). Resistor 171 is an external resistor which simulates resistor 128 and is used to test the circuit 121. The computer 145 then facilitates the measurement of the gain of the circuit 21 utilizing the detector 147 and voltmeter 154. The measured gain level is stored by the computer 145. Thereafter, a test is made to determine if the measured gain is less than the minimal nominal value or greater than the maximum nominal value of gain. This test is to determine whether this portion of the circuit 121 is operating normally. If the test indicates that circuit 121 is a failure, the circuit is discarded. However, if the test indicates that circuit 121 is operating properly, the computer 145 energizes relay coil K4 which operates relay contacts K4A, K4B and K4C. This facilitates the application of the signal through resistor 128. The detected gain should drop to approximately minus 14.0 dB. The computer 145 then facilitates the movement of the laser 144 to a position above the resistor 128. Thereafter, a procedure is called which facilitates the trimming of the resistor 128 by the laser 144.

Figure 9:
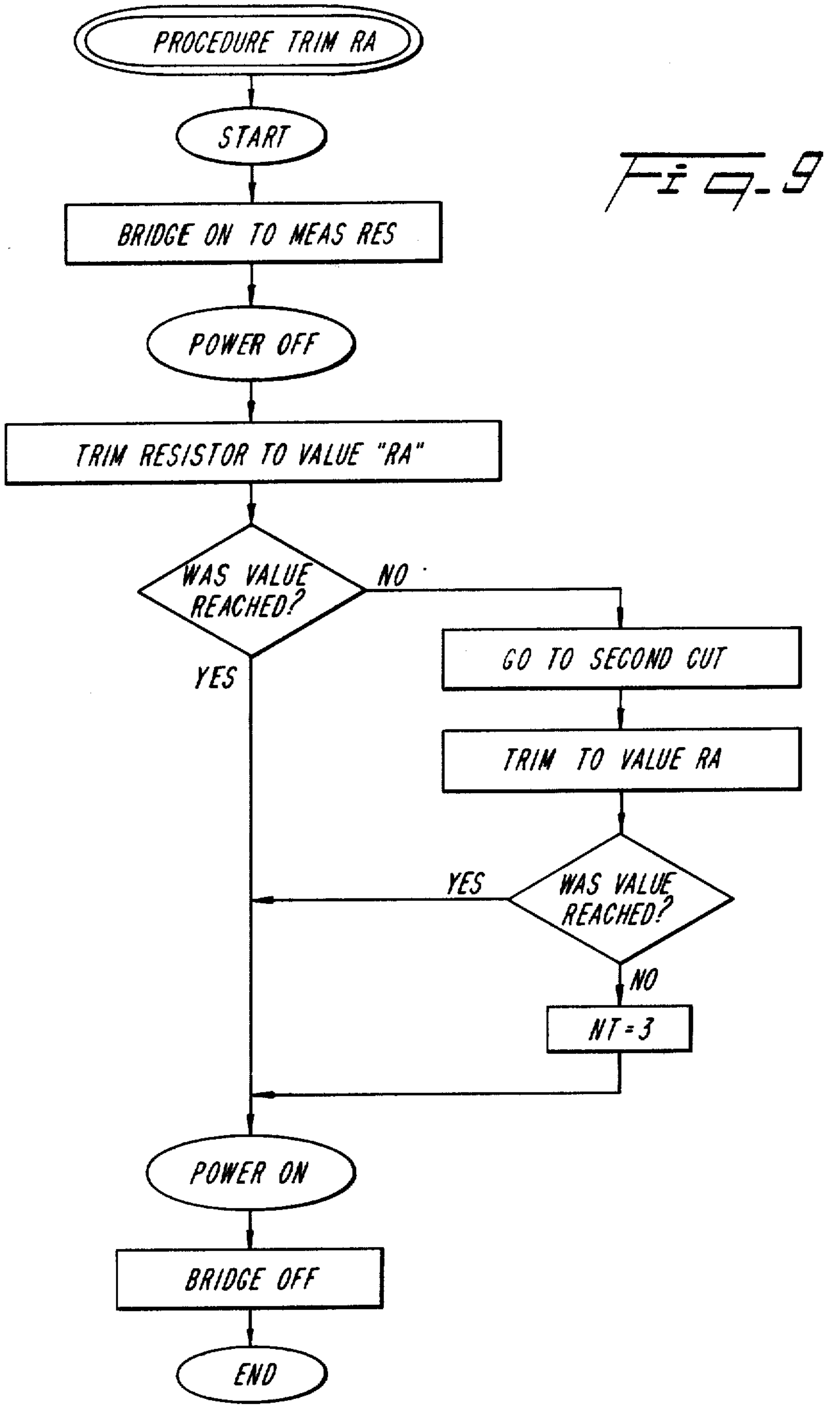

Referring to FIG. 9, the flow chart illustrated therein reveals the steps of the procedure which facilitate the coarse trimming of resistor 128. The laser 144 cuts one rung 136 (FIG. 2) of the resistor 128 along trim line 138. The gain of the circuit 121 is measured and the laser 144 continues to cut one rung 136 at a time until nine rungs have been cut or the measured gain is approximately greater than minus 3.0 dB. If the measured gain is not greater than minus 3.0 dB after cutting the nine rungs 136, the laser moves to trim line 139 and continues to cut the rungs until the measured gain is greater than minus 3.0 dB or eleven rungs have been cut. If the measured gain is not greater than minus 3.0 dB after cutting the eleven rungs 136 along trim line 139, the laser 144 is moved back to trim line 138 and cuts the remaining two rungs. If the measured gain is still not greater than minus 3.0 dB, the circuit 21 can not be trimmed and a flag (NT=3) is set and the procedure is stopped.

Figure 6:
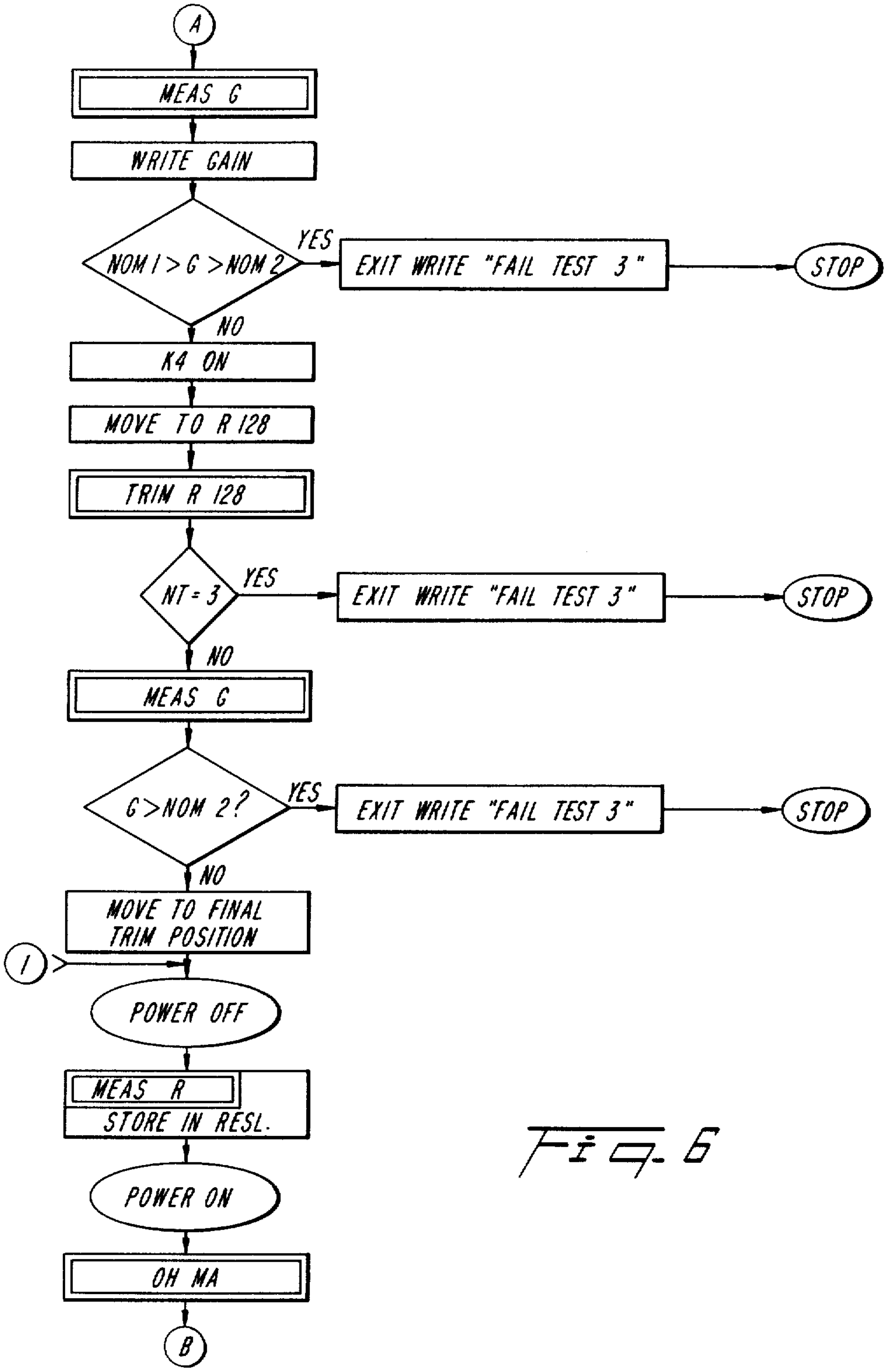

Referring to FIG. 6, the gain is measured and is compared with NOM2. If the measured gain exceeds NOM2, resistor 128 is overtrimmed and the procedure is stopped. Otherwise, the laser 144 is moved to trim line 141 to facilitate fine adjustment of the resistor 128. The computer 145 energizes relay coil K18 which operates relay contacts K18A and K18B to remove the power levels from the adapter circuit 151. The bridge circuit 153, which is coupled across the resistor 128, measures the value of resistance and stores the result in RESL within the computer 145. The computer 145 de-energizes relay coil K18 thus restoring power to the adapter circuit 151 and calls procedure OHMA. Procedure OHMA calculates the amount of safety resistance which is to be added in series with resistor 128 during fine trimming. The safety resistance permits the system 143 to trim quickly to the desired value including the safety resistance value without overtrimming the resistor 128.

Figure 11:
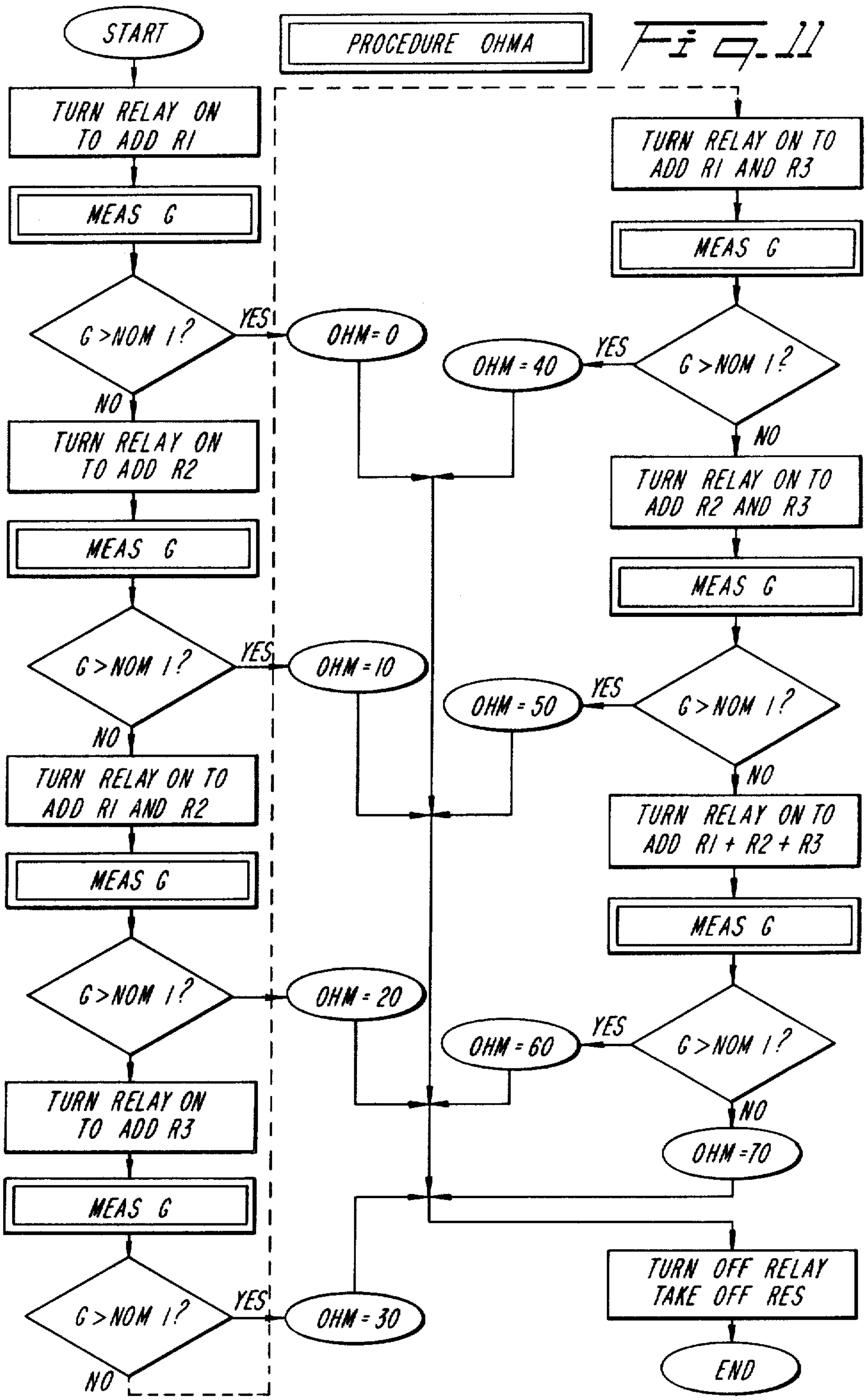

Referring to FIG. 11, the flow chart illustrated therein reveals the steps of the procedure OHMA which calculates which of the safety resistors 167, 168 and 169 are to be added in series with the resistor 128. First, the computer 145 energizes relay coil K1 to operate and open relay contact K1A which adds resistor 167 in series with the resistor 128. The gain is measured and a test made to determine if the measured gain exceeds NOM1. The NOM1 is exceeded the amount of safety resistance (OHM) to be added is zero and the relay coil K1 is de-energized. If the measured gain did not exceed NOM1, the computer 145 energizes relay coil K2 and de-energises relay coil K1 which operates and opens relay contact K2A and adds resistor 168 in series with resistors 128. The gain is measured again and compared to NOM1. If the measured gain exceeds NOM1, OHM is equal to ten and relay coil K2 are de-energized. If the measured gain did not exceed NOM1, the computer de-energizes relay coil K2 and energizes relay coils K1 and K2 which operates and opens relay contacts K1A and K2A to add resistors 167 and 168 in series with the resistor 128. The gain is measured and compared to NOM1. If the gain exceeds NOM1, OHM is equal to twenty and relay coils K1 and K2 are de-energized. However, if the gain did not exceed NOM1, relay coils K1 and K2 are de-energized and relay coil K3 is energized to add resistor 169 in series with resistor 128. The gain is measured and if it exceeds NOM1, OHM is equal to thirty. Relay coil K3 is then de-energized. If the gain did not exceed NOM1, the computer 145 thereafter selects the remaining combinations of resistors 167, 168 and 169 by energizing the appropriate relay coils K1, K2 and K3. If resistors 167 and 169 are selected to be placed in series with resistor and the measured gain does exceed NOM1, OHM is equal to forty otherwise the computer 145 selects resistors 168 and 169. If the gain resulting from the selection of these resistors does exceed NOM1, OHM is equal to fifty otherwise the computer selects resistors 167, 168 and 169 to be placed in series with resistor 128. If the measured gain resulting from the selection of the resistors 167, 168 and 169 does not exceed NOM1, OHM is equal sixty otherwise OHM is equal to seventy. Thereafter the computer 145 de-energizes relay coils K1, K2 and K3.

Figure 7:
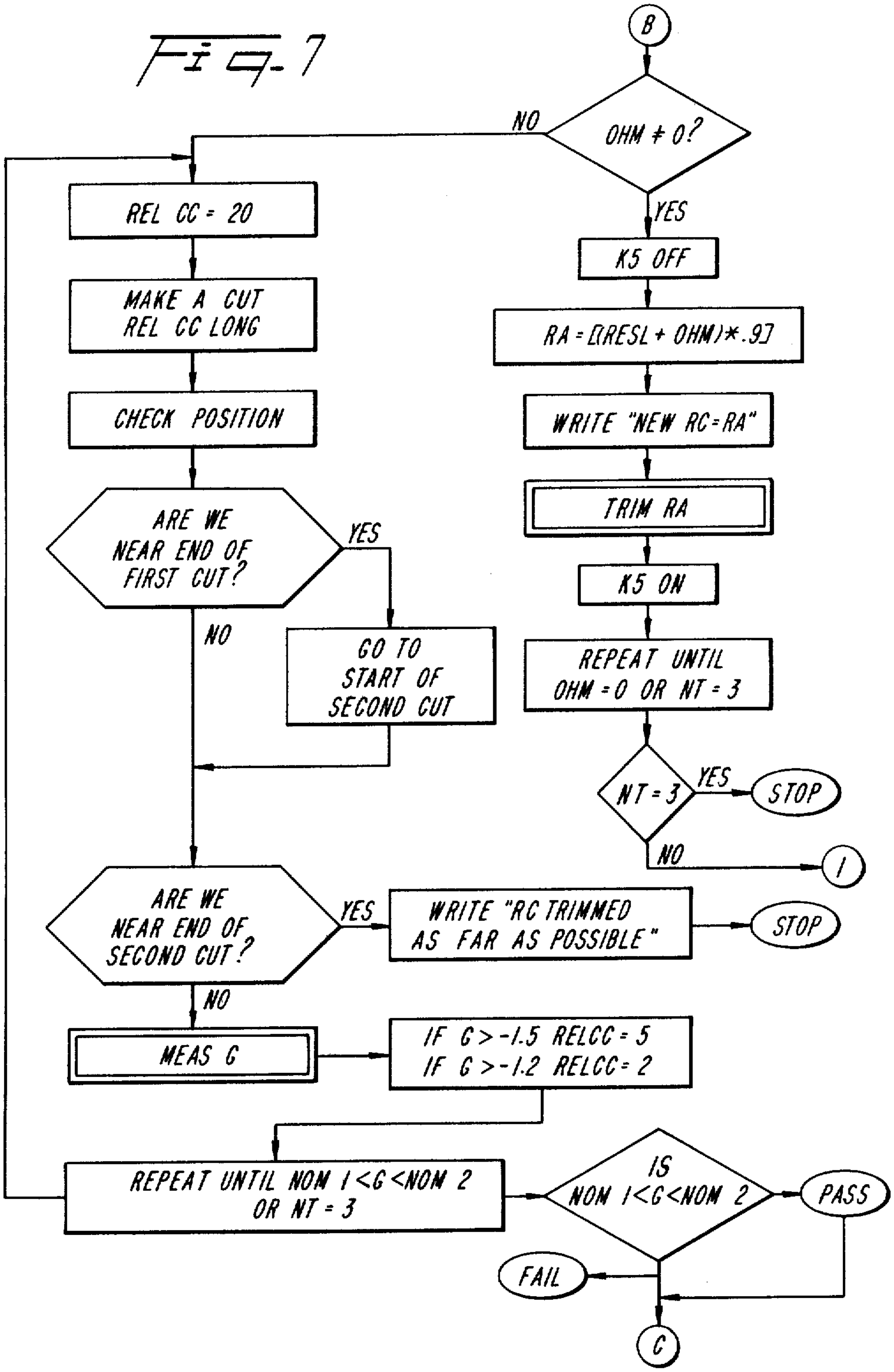
Figure 8:
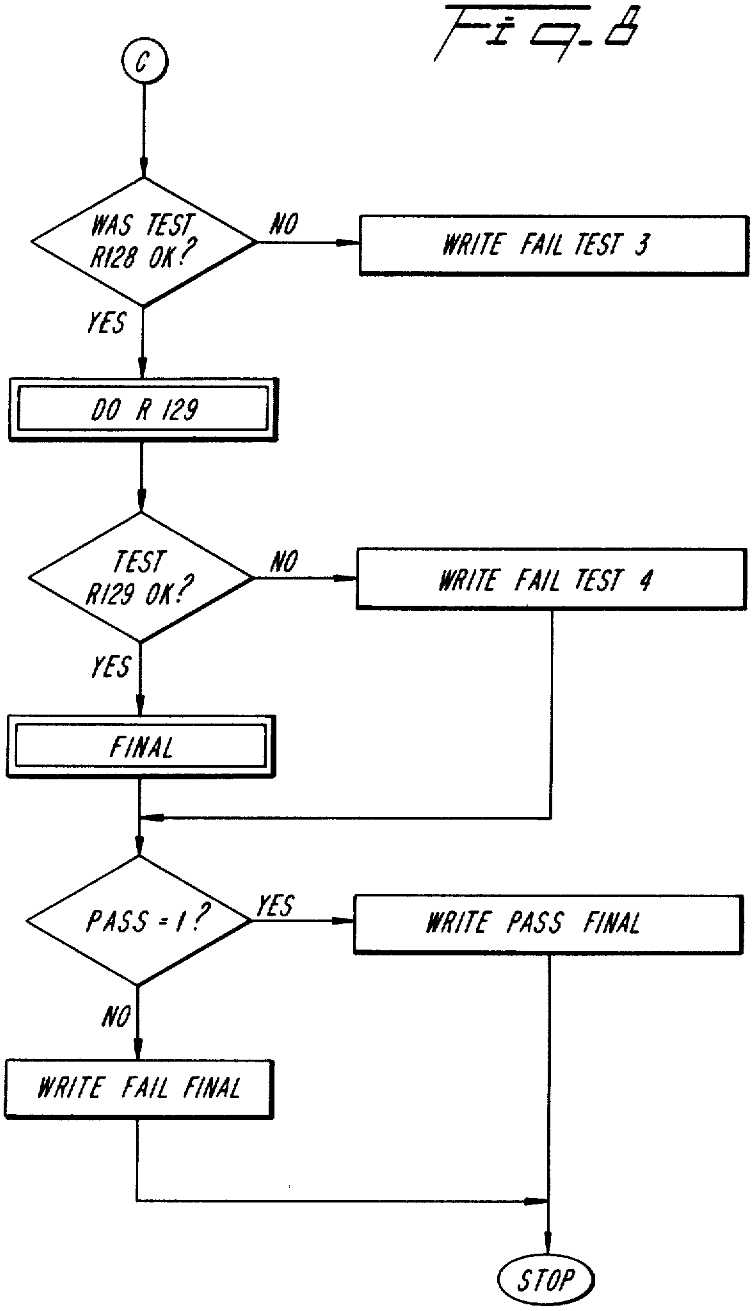

Referring to FIG. 7, a test is made to determine the value stored in OHM. If OHM is not equal to zero, relay coil K5 is de-energized and the value stored in OHM is added to RESL, which represents the basic resistance value. Ninety percent of the basic value is stored in a location RA and represents the trim target value of resistor 128 referred to as target value RA. The computer 145 calls a procedure TRIM RA which will trim the resistor 128.

Figure 10:
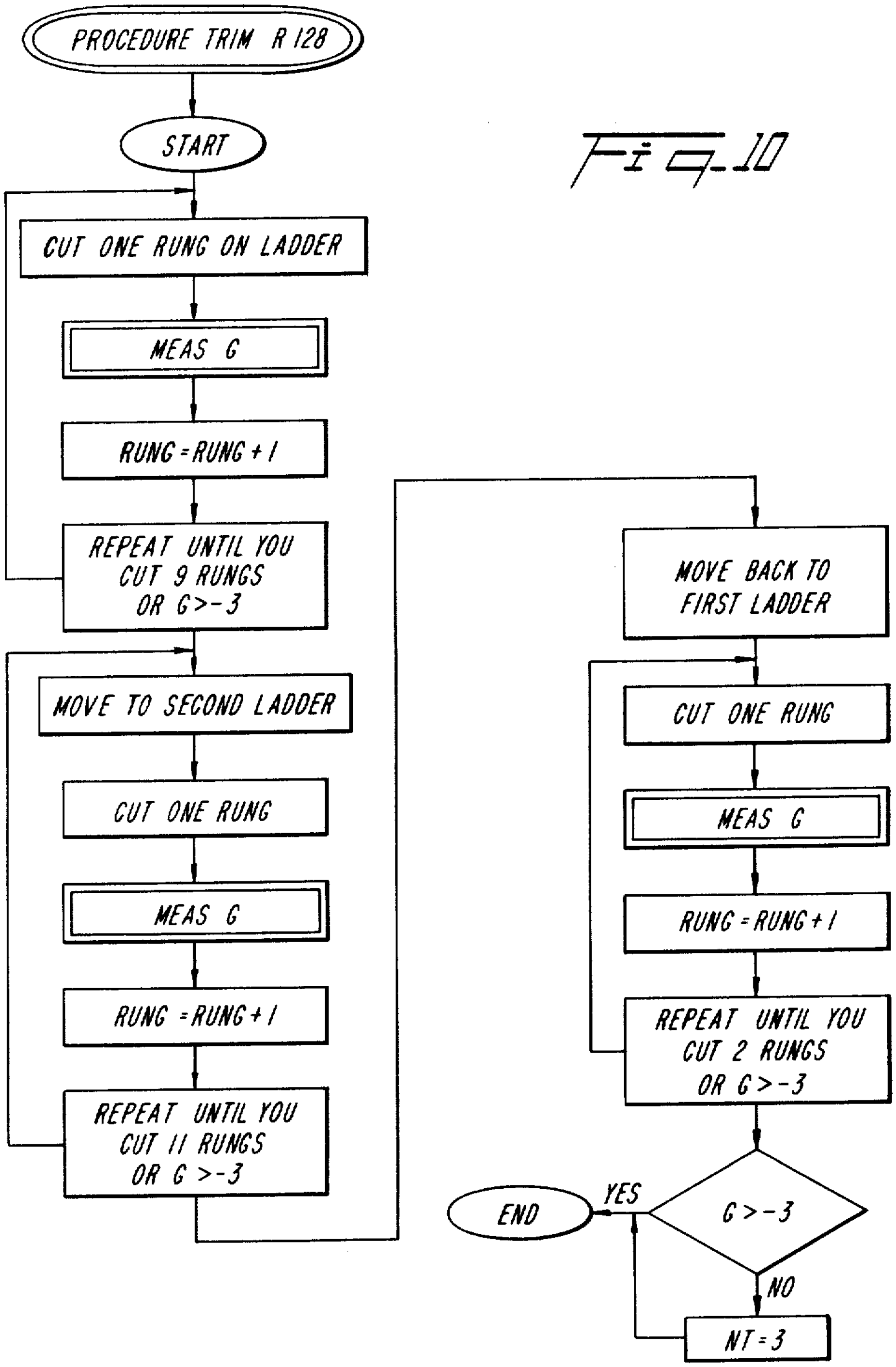

Referring to FIG. 10, the flow chart illustrated therein reveals the steps of the procedure TRIM RA. The computer 145 energizes (1) the bridge circuit 153, which will simultaneously measure the changing value of resistor 128 during the trimming thereof, and (2) relay coil K18, which is controlled to remove power from the circuit 121. The laser 144 is controlled to trim the resistor 128 along trim line 141 (FIG. 2) until the target value RA is attained. If the target value was attained, power is restored by de-energizing relay coil K18 and the bridge circuit 153 is de-energized. If the target value was not attained, the laser 144 is moved to trim along trim line 142 (FIG. 2). If the target value was attained during the trimming along line 142, power is restored and the bridge circuit 153 is de-energized. If the target value was not attained after the second trim along trim line 142, it becomes apparent that the final desired resistance value for resistor 128 can not be attained due to limitations on the finite trim distance allowed for trim line 142. Therefore, a flag NT is set to a value of three to indicate this failure. The power is then restored and the bridge circuit 153 is de-energized.

Referring again to FIG. 7, after the procedure TRIM RA has ended, relay coil K5 is energized to allow the signal to flow through resistor 128. If NT is equal to three, the procedure is halted and hybrid circuit 121 is discarded. Otherwise, the trim procedure repeats itself until OHM is equal to zero or the flag NT is equal to three. Therefore, if the trim procedure is to be repeated, the resistor 128 is measured again and the result stored in RESL and procedure OHMA is called to select the appropriate amount safety resistance OHM. If OHM is not equal to zero, which indicates some amount of safety resistance is required, a new target value is stored in RA and the procedure TRIM RA is called to trim resistor 128 as described above. If the value of OHM above is equal to zero, the fine-trim procedure enters the second phase. The computer 145 sets a predetermined distance, for example 0.020 inch, for the initial trim by the laser 144 during the second phase. This is stored in computer 145 in location RELCC. The laser 144 cuts along one of the trim lines 141 or 142, depending upon the position of the laser at the end of the procedure TRIM RA above, for a distance of 0.020 inch. The computer 145 then determines the position of the laser 144 on the trim lines 141 or 142 after the 0.020 inch cut has been made. If the position of the laser 144 is near the end of the trim line 141, the laser is moved to the beginning of trim line 142. If the laser is near the end of trim line 142, the computer 145 prints a message indicating the resistor 128 has been trimmed to a maximum allowable distance and the procedure is stopped. The hybrid circuit 121 has therefore failed and must be discarded. However, if the laser is not near the end of trim line 142, the gain is measured and compared to minus 1.5 dB and minus 1.2 dB. If the gain is greater than minus 1.5 dB, RELCC is set to 0.005 inch or if the gain is greater than minus 1.2 dB, RELCC is set to 0.002 inch. This trim procedure is repeated until the measured gain is greater than NOM1 but less than NOM2 or the flag NT is set to three. If the gain is between the nominal values NOM1 and NOM2, the resistor 128 has been trimmed to the target value. If the measured gain is not within the range between NOM1 and NOM2, the computer 145 prints a message that resistor 128 can not be trimmed to the desired value. The procedure is stopped and the hybrid circuit 121 is discarded. However, if the resistor 128 has been trimmed to the target value, the computer 145 calls a procedure to test and trim resistor 129 in a manner similar to that described above for resistor 128. If the testing and trimming of resistor 129 is successful, the computer 145 calls a procedure FINAL which sets a flag PASS equal to one. If the testing of resistor 129 was not successful, the computer 145 facilitates the printing of a message indicating a test failure. A test is then performed to determine if the flag PASS is equal to one. If the flag PASS is equal to one, the computer facilitates the writing of a message indicating resistors 126, 127, 128 and 129 of the circuit 121 have been trimmed to their respective desired values. If the flag PASS is not equal to one, the computer 145 facilitates the writing of a message indicating that the resistors 126, 127, 128 and 129 have not been trimmed to their respective desired values and the procedure is stopped and the hybrid circuit 121 is discarded.

The procedure for testing and trimming resistor 126 is substantially similar to the one described above for resistor 128 except that the nominal value NOM1 is equal to minus 1.660 dB and nominal value NOM2 is equal to minus 1.620 dB as previously noted. Moreover, relay coil K11 is energized to place resistor 166 into the circuit 151. The input signal is fed through normally closed relay contact K5A, resistor 189, normally closed relay contacts K6A and K6B, transformer 191 and into the hybrid circuit 121. Safety resistors 156, 157 and 158 are associated with resistor 126 and are used in the same manner described above for resistors 167, 168 and 169. The resistor 159 is an external resistor and is used to test the hybrid circuit 121 in a similar manner as described above for resistor 171. After this test is completed, relay coil K15 is energized to remove resistor 159 and couple resistor 126 to the adapter circuit 121. The remainder of the procedure is similar to the procedure described above for resistor 128.

The procedure for testing and trimming resistor 127 requires a nominal value NOM1 of minus 1.635 dB and a nominal value NOM2 of minus 1.700 dB. Moreover, relay coils K6 and K12 are energized. The input signal for this procedure must pass through the attenuator circuit which includes resistors 201, 202 and 203 (FIG. 4) prior to passing through transformer 191. As noted above, due to variations in different codes of integrated circuits 21, resistors 164 and 166 may be selectively added to the adapter circuit 151 to establish a gain signal which is required for the particular code being trimmed. The resistors 164 and 166 simulate corresponding resistors values contained within the circuit being simulated. Thus, relay coils K10, K11, K13 and K14 may be energized. Safety resistors 161, 162 and 163 are associated with resistor 127 and are used in the same manner as 167, 168 and 169 described above. The remainder of the procedure is similar to the procedure described above for resistor 128.

The procedure for testing and trimming resistor 129 requires a nominal value NOM1 of 35.090 dB and a nominal value NOM2 of 35.170 dB. Moreover, relay coils K4, K5, K12 and K16 must be energized. This procedure is similar to the procedure for resistor 128 except the output signal bypasses the attenuator which includes resistors 208, 209 and 210 (FIG. 4). Resistors 176 and 177 are selected in the manner described above for resistors 164 and 166. Safety resistors 172, 173 and 174 are associated with resistor 129 and are used in the same manner as described above with respect to resistors 167, 168 and 169. The remainder of the procedure is similar to the procedure described above for resistor 128.

As noted above, integrated circuit 124, which is disclosed in the Digest of Technical Papers of the IEEE International Solid-State Circuits Conference, first edition, February, 1972, at pages 174 and 175, is herein incorporated by reference thereto. Integrated circuits 122 and 123 disclosed in FIG. 12 and in U.S. Pat. No. 3,919,654, which issued to Rouben Toumani on Nov. 11, 1975, are incorporated herein by reference thereto.

What is claimed is:

1. A method of trimming a film resistor which comprises the steps of:
   - determining the resistance value of the resistor;
   - connecting the resistor in a gain-producing circuit;
   - establishing a gain level for the gain-producing circuit related to a basic resistance value of the resistor;
   - selectively adding resistance to the resistor in the gain-producing circuit to increase the gain to a level not to exceed the established gain level;
   - adding the determined value of the resistor and the value of the selectively added resistance to obtain the basic resistance value;
   - trimming the resistor to increase the value thereof; and
   - stopping the trimming of the resistor when the trimmed value thereof is equal to the basic resistance value.

2. A method of trimming a film resistor which comprises the steps of:
   - connecting the resistor in a gain-producing circuit;
   - establishing a first gain level related to a value of resistance of the resistor below a first-trimmed value of the resistor to which the resistor is to be trimmed;
   - trimming the resistor to increase the gain to the established first gain level wherein the resistance value is now the first-trimmed value;
   - establishing a second gain level for the gain-producing circuit related to a basic resistance value of the resistor;
   - selectively adding resistance to the resistor in the gain-producing circuit to increase the gain to a level not to exceed the second gain level;
   - adding the first-trimmed value of the resistor and the value of the selectively added resistance to obtain the basic resistance value;
   - trimming further the resistor to increase the value thereof to a second-trimmed value; and
   - stopping the trimming of the resistor when the second-trimmed value thereof is equal to the basic resistance value.

3. The method of trimming as set forth in claims 1 or 2 which further comprises the steps of:
   - establishing a final gain level for the gain-producing circuit related to a desired final value of resistance of the resistor greater than the basic resistance value; and
   - trimming the resistor to increase the gain to the established final gain level wherein the resistance value of the resistor is now the final desired value.

4. The method of trimming as set forth in claim 1 wherein the step of stopping the trimming includes the step of measuring the resistance of the resistor while the resistor is being trimmed.

5. The method of trimming as set forth in claim 1, wherein the basic resistance value is a first basic value and wherein the trimmed value is a first trimmed value and which further comprises the steps of:
   - establishing a second basic resistance value after the resistor has been trimmed wherein the second basic value is greater than the the trimmed value;
   - trimming the resistor to increase the value thereof; and
   - stopping the trimming of the resistor when the trimmed value thereof is equal to the second basic value.

6. A method of trimming a film resistor, which comprises the steps of:
   - connecting the resistor in a gain-producing circuit;
   - determining the resistance value of the resistor;
   - establishing a gain level for the gain-producing circuit related to a basic resistance value of the resistor;
   - selectively adding resistance to the resistor in the gain-producing circuit to increase the gain to a level not to exceed the established gain level;
   - adding the determined value of the resistor and the value of the selectively added resistance to obtain the basic resistance value;
   - selecting a trim target resistance value less than the basic resistance value;
   - trimming the resistor to increase the value thereof; and
   - stopping the trimming of the resistor when the trimmed value is equal to the trim target resistance value.

7. An apparatus for trimming a film resistor, which comprises:
   - a gain-producing circuit;
   - means for determining the resistance value of the resistor;
   - means for connecting the resistor in the gain-producing circuit;

means for establishing a gain level for the gain-producing circuit related to a basic resistance value of the resistor;

means for selectively adding resistance to the resistor in the gain-producing circuit to increase the gain to a level not to exceed the gain level determined by the establishing means;

means for adding the determined value of the resistor and the value of resistance determined by the selectively adding means to produce the basic resistance value;

means for trimming the resistor to increase the value thereof; and means for stopping the trimming of the resistor when the trimmed value thereof is equal to the basic value.

8. An apparatus for trimming a film resistor, which comprises:

a gain-producing circuit;

means for connecting the resistor in the gain-producing circuit means for establishing a first gain level related to a value of resistance of the resistor below a first-trimmed value of the resistor to which the resistor is to be trimmed;

means for trimming the resistor to increase the gain to a level determined by the first gain establishing means where the resistance value is now the first-trimmed value;

means for establishing a second gain level for the gain-producing circuit related to a basic resistance value of the resistor;

means for selectively adding resistance to the resistor in the gain-producing circuit to increase the gain to a level not to exceed the gain level determined by the second gain level establishing means;

means for adding the first-trimmed value of the resistor and the value of resistance determined by the selectively adding means to produce the basic resistance value;

means for trimming the resistor to increase the value thereof to a second-trimmed value; and means for stopping the trimming of the resistor when the second-trimmed value thereof is equal to the basic resistance value.

9. The apparatus for trimming as set forth in claim 7 or 8, which further comprises:

means for connecting the resistor in the gain-producing circuit subsequent to trimming the resistor to the basic resistance value;

means for establishing a final gain level for the gain-producing circuit related to a desired final value of resistance of the resistor greater than the basic resistance value; and means for trimming the resistor to increase the gain to the level determined by the establishing means where the resistance value of the resistance is now the desired value.

10. The apparatus for trimming as set forth in claim 7 wherein the stopping means includes means for measuring the resistance of the resistor while the resistor is being trimmed.

11. The apparatus for trimming as set forth in claim 7, wherein the basic resistance value is a first basic value and wherein the trimmed value is a first trimmed value and which further comprises:

means for establishing a second basic resistance value after the resistor has been trimmed wherein the second basic value is greater than the first trimmed value;

means for trimming the resistor to increase the value thereof; and means for stopping the trimming of the resistor when a second trimmed value thereof is equal to the second basic value.

12. An apparatus for trimming a resistor, which comprises:

a gain producing circuit;

means for connecting the resistor in the gain-producing circuit;

means for determining the resistance value of the resistor;

means for establishing a gain level for the gain-producing circuit related to a basic resistance value of the resistor;

means for selectively adding resistance to the resistor in the gain-producing circuit to increase the gain to a level not to exceed the gain level determined by the establishing means;

means for adding the determined value of the resistor and the value of resistance determined by the selectively adding means to produce the basic resistance value;

means for selecting a trim target resistance value less than the basic resistance value;

means for trimming the resistor to increase the value thereof; and means for stopping the trimming of the resistor when the trimmed value is equal to the trim target resistance value.

13. A method of trimming a film resistor which comprises the steps of:

connecting the resistor in a gain-producing circuit;

establishing a gain level related to a value of resistance to which the resistor is to be trimmed on a first-trimmed value of the resistor;

trimming the resistor to increase the gain to the established gain level wherein the resistance value is now the first-trimmed value;

establishing a basic resistance value which is greater than the first-trimmed value of the resistor to be trimmed;

trimming the resistor to increase the value thereof; and stopping the trimming of the resistor when the trimmed value thereof is equal to the basic resistance value.

* * * * *